US012776044B2

(12) United States Patent
Okano et al.

(10) Patent No.: US 12,776,044 B2
(45) Date of Patent: Oct. 27, 2026

(54) IMAGE PROCESSING APPARATUS, IMAGE PROCESSING METHOD, AND IMAGE PROCESSING PROGRAM

(71) Applicant: Resonac Corporation, Tokyo (JP)

(72) Inventors: Yu Okano, Tokyo (JP); Kazuki Ueda, Tokyo (JP); Shimpei Takemoto, Tokyo (JP); Shinya Hirasawa, Tokyo (JP); Yoshishige Okuno, Tokyo (JP)

(73) Assignee: Resonac Corporation, Tokyo (JP)

( * ) Notice: Subject to any disclaimer, the term of this patent is extended or adjusted under 35 U.S.C. 154(b) by 197 days.

(21) Appl. No.: 18/870,102

(22) PCT Filed: May 29, 2023

(86) PCT No.: PCT/JP2023/019936

§ 371 (c)(1),
(2) Date: Nov. 27, 2024

(87) PCT Pub. No.: WO2023/238726

PCT Pub. Date: Dec. 14, 2023

(65) Prior Publication Data

US 2025/0322530 A1 Oct. 16, 2025

(30) Foreign Application Priority Data

Jun. 6, 2022 (JP) ................................ 2022-091556

(51) Int. Cl.

*G06T 7/12* (2017.01)
*G06T 7/155* (2017.01)
*G06T 7/194* (2017.01)

(52) U.S. Cl.

CPC ................ *G06T 7/155* (2017.01); *G06T 7/12* (2017.01); *G06T 7/194* (2017.01); *G06T 2207/20084* (2013.01); *G06T 2207/20152* (2013.01)

(58) Field of Classification Search

CPC ............... G06T 7/155; G06T 7/10–194; G06T 2207/20084; G06T 2207/20152
See application file for complete search history.

(56) References Cited

U.S. PATENT DOCUMENTS 11,288,535 B1 3/2022 He et al.
2017/0132803 A1* 5/2017 Zhao ......................... G06T 5/70
(Continued)

FOREIGN PATENT DOCUMENTS

CN 114332144 4/2022
CN 114332144 A * 4/2022
(Continued)

OTHER PUBLICATIONS

Code-Graffiti, [Python] Watershed algorithm and object segmentation using OpenCV, [online], Mar. 26, 2020, [retrieval date Jun. 23, 2023]. Internet: <URL: https://codegraffiti.com/opencv-watershed-algorithm-in-python/>.
(Continued)

*Primary Examiner* — Sean T Motsinger
(74) *Attorney, Agent, or Firm* — IPUSA, PLLC

(57) ABSTRACT

An image processing apparatus includes a memory; and a processor configured to: generate a binary image from a target image by using a first trained model that binarizes the target image into object regions and a background region and generates the binary image; predict contour lines of the object regions in the binary image by using a second trained model that predicts the contour lines of the object regions in the binary image; generate an expanded contour line image by performing expansion processing on the predicted contour lines; generate a foreground region image based on the binary image and the expanded contour line image; and use background pixels identified based on the binary image, boundary pixels identified based on the expanded contour line image, and foreground pixels identified based on the
(Continued)

foreground region image to divide the target image into the object regions by a watershed method.

9 Claims, 13 Drawing Sheets

(56) References Cited

U.S. PATENT DOCUMENTS

| | | | | |
|---|---|---|---|---|
| 2020/0250830 | A1* | 8/2020 | Chae | G06T 7/155 |
| 2021/0192715 | A1 | 6/2021 | Leshem et al. | |
| 2021/0278655 | A1* | 9/2021 | Wilson | G02B 21/367 |

FOREIGN PATENT DOCUMENTS

| | | |
|---|---|---|
| CN | 114494946 | 5/2022 |
| JP | 2018-116391 | 7/2018 |
| JP | 2021-120815 | 8/2021 |
| KR | 10-2020-095873 | 8/2020 |
| WO | 2021/178938 | 9/2021 |

OTHER PUBLICATIONS

Watanabe, Rice Field Heat Map based on the Gaze of Experts in Growth Diagnosis, vol. 119 No. 441 [online], IEICE Technical Report, Apr. 27, 2020 (accession date), with English abstract.

Igarashi et al., Matching axial images of magnetic resonance imaging and transrectal ultrasound based on deep learning, Dec. 26, 2019 (accession date), Lecture proceedings of ROBOMECH 2019, The Japan Society of Mechanical Engineers, with English abstract.

* cited by examiner

IMAGE PROCESSING APPARATUS, IMAGE PROCESSING METHOD, AND IMAGE PROCESSING PROGRAM

TECHNICAL FIELD

The present disclosure relates to an image processing apparatus, an image processing method, and an image processing program.

BACKGROUND ART

Examples of a regional division method of identifying regions of objects included in a target image, and dividing the target image according to the identified regions of the objects, include a method using image analysis such as a watershed method and a method using deep learning such as R-CNN or a Selective-Search method.

RELATED-ART DOCUMENTS

Patent Documents

Patent Document 1: Japanese Laid-Open Patent Publication No. 2021-120815

SUMMARY OF THE INVENTION

Problem to be Solved by the Invention

In a case where an image of a plurality of densely arranged and inhomogeneous objects (an object group) (for example, an image obtained by photographing a group of particle bodies having various irregularities and shading therein, as well as different outer shapes and sizes) is used as a target image, it is difficult to divide the target image into regions with high accuracy.

For example, in the case of the method using image analysis described above, it is necessary to find a parameter suitable for each of a plurality of objects. In addition, in the case of the method using deep learning described above, it is necessary to prepare a huge number of images including objects having various configurations as training data.

An object of the present disclosure is to improve division accuracy when an image of an inhomogeneous object group is divided into regions.

Means to Solve the Problem

An image processing apparatus according to a first aspect of the present disclosure includes:

- a binary image generation part configured to generate a binary image from a target image by using a first trained model that binarizes the target image into object regions and a background region and generates the binary image;
- a prediction part configured to predict contour lines of the object regions in the binary image, generated from the target image, by using a second trained model that predicts the contour lines of the object regions in the binary image;
- an expanded contour line image generation part configured to generate an expanded contour line image by performing expansion processing on the predicted contour lines;
- a foreground region image generation part configured to generate a foreground region image based on the binary image generated from the target image and the expanded contour line image; and
- a regional division part configured to use background pixels identified based on the binary image generated from the target image, boundary pixels identified based on the expanded contour line image, and foreground pixels identified based on the foreground region image to divide the target image into the object regions by a watershed method.

A second aspect of the present disclosure is the image processing apparatus according to the first aspect, wherein the binary image generation part is configured to use trained U-Net as the first trained model to generate the binary image from the target image.

A third aspect of the present disclosure is the image processing apparatus according to the second aspect, wherein the prediction part is configured to use trained U-Net as the second trained model to generate a contour line image from the binary image generated from the target image.

A fourth aspect of the present disclosure is the image processing apparatus according to the third aspect, wherein the foreground region image generation part is configured to generate the foreground region image by calculating a difference between the binary image generated from the target image and the expanded contour line image.

A fifth aspect of the present disclosure is the image processing apparatus according to the first aspect, wherein the target image is an image obtained by photographing a particle body group under a predetermined condition.

A sixth aspect of the present disclosure is the image processing apparatus according to the fifth aspect, further comprising a statistical processing part configured to analyze an image of each of the object regions divided from the target image and perform statistical processing.

A seventh aspect of the present disclosure is the image processing apparatus according to the sixth aspect, wherein the statistical processing part is configured to change, based on a result of the statistical processing, a process condition of a process of generating the particle body group.

An eighth aspect of the present disclosure is an image processing method performed by a computer, the image processing method including:

- a step of generating a binary image from a target image by using a first trained model that binarizes the target image into object regions and a background region and generates the binary image;
- a step of predicting contour lines of the object regions in the binary image generated from the target image, by using a second trained model that predicts the contour lines of the object regions in the binary image;
- a step of generating an expanded contour line image by performing expansion processing on the predicted contour lines;
- a step of generating a foreground region image based on the binary image generated from the target image and the expanded contour line image; and
- a step of using background pixels identified based on the binary image generated from the target image, boundary pixels identified based on the expanded contour line image, and foreground pixels identified based on the foreground region image to divide the target image into the object regions by a watershed method.

A ninth aspect of the present disclosure is an image processing program for causing a computer to execute a process including:

- a step of generating a binary image from a target image by using a first trained model that binarizes the target image into object regions and a background region and generates the binary image;
- a step of predicting contour lines of the object regions in the binary image generated from the target image by using a second trained model that predicts the contour lines of the object regions in the binary image;
- a step of generating an expanded contour line image by performing expansion processing on the predicted contour lines;
- a step of generating a foreground region image based on the binary image generated from the target image and the expanded contour line image; and
- a step of using background pixels identified based on the binary image generated from the target image, boundary pixels identified based on the expanded contour line image, and foreground pixels identified based on the foreground region image to divide the target image into the object regions by a watershed method.

Effects of the Invention

Accordingly to the present disclosure, division accuracy when an image of an inhomogeneous object group is divided into regions can be improved.

MODE FOR CARRYING OUT THE INVENTION

Figure 1:
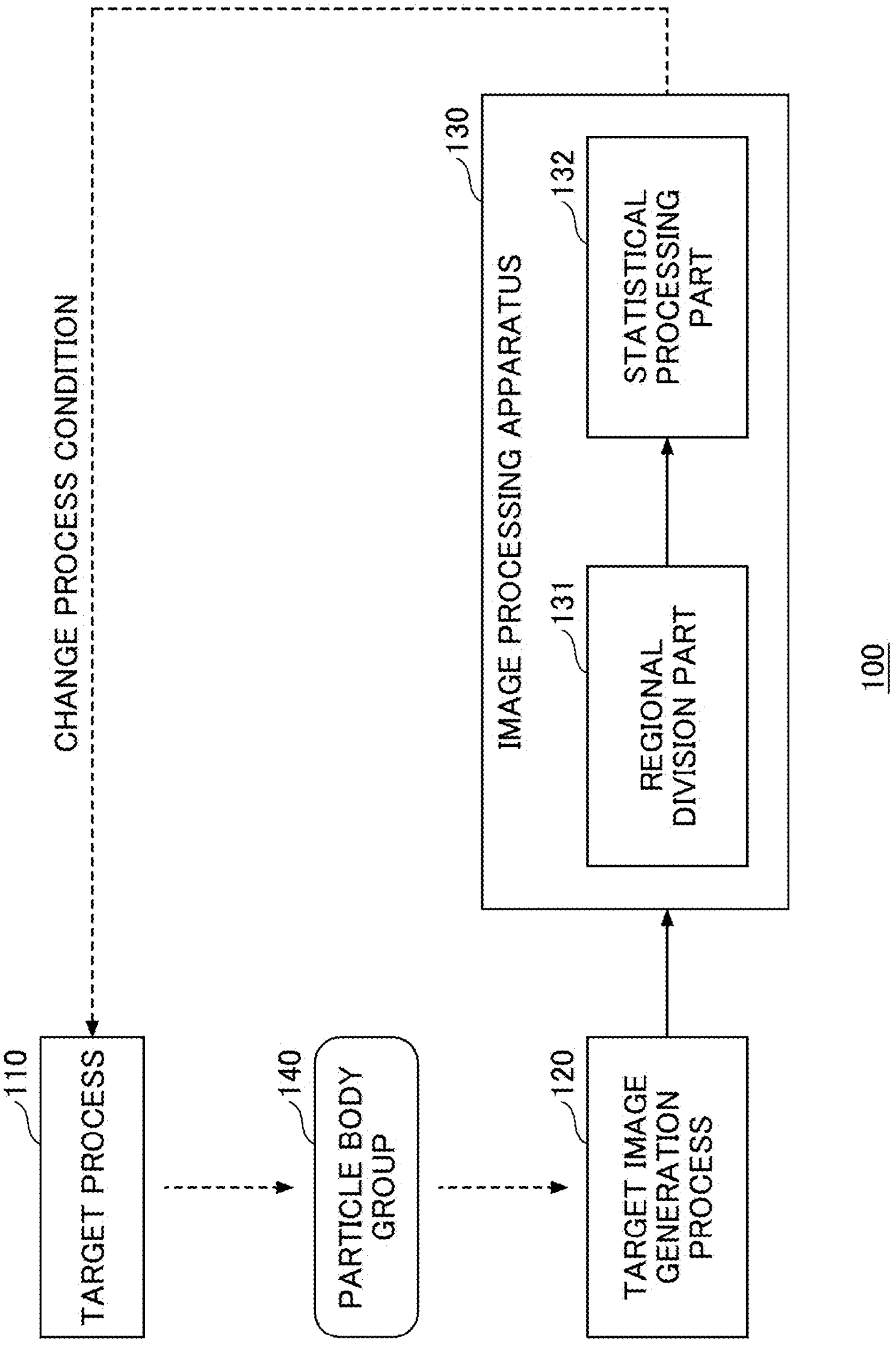
FIG. 1 is a diagram illustrating an example of a system configuration of a process control system.

Hereinafter, each embodiment will be described with reference to the accompanying drawings. In the present specification and the drawings, components having substantially the same functional configuration are denoted by the same reference numeral and a duplicate description will be omitted.

First Embodiment

<System Configuration of Process Control System>

First, a system configuration of the entire process control system including an image processing apparatus according to a first embodiment will be described. FIG. 1 is a diagram illustrating an example of the system configuration of the process control system.

As illustrated in FIG. 1, a process control system 100 includes a target process 110, a target image generation process, and an image processing apparatus 130.

The target process 110 is a particle body group generating process that is a process for generating a plurality of particle bodies (a particle body group). Examples of the particle body group herein include a sintered body group generated by a sintering process and spheroids generated by a culturing process.

The particle body group generated by the target process 110 is conveyed to a target image generation process 120.

The target image generation process 120 generates an image of a plurality of densely arranged objects (an object group) as a target image to be processed by the image processing apparatus 130 by photographing the conveyed particle body group under a predetermined condition.

In a case where the particle body group is, for example, a sintered body group, the target image generation process 120 generates a target image of a group of densely arranged and inhomogeneous objects by embedding the sintered body group in a resin so as to form a single mass, and photographing a cut surface obtained by cutting the formed mass.

Further, in a case where the particle body group is, for example, spheroids, the target image generation process 120 generates a target image of a group of densely arranged and inhomogeneous objects by photographing a culture solution including three-dimensionally cultured spheroids through a microscope.

The target image generated by the target image generation process 120 is provided to the image processing apparatus 130.

An image processing program is installed in the image processing apparatus 130, and the image processing apparatus 130 functions as a regional division part 131 and a statistical processing part 132 by executing the image processing program.

The regional division part 131 divides the target image including the object group into object regions, and notifies the target image divided into the object regions to the statistical processing part 132. In the present embodiment, the regional division part 131 divides the target image into the object regions by combining a method using image analysis and a method using deep learning. Specifically, a watershed method, which is an example of image analysis, and U-Net, which is an example of deep learning, are combined, and images (a background region image, a foreground region image, and a boundary region image) to be used in the watershed method are generated by using the U-Net, and then the target images are divided by the watershed method.

Accordingly, even when an image of a group of densely arranged and inhomogeneous objects is used as a target image, the regional division part 131 according to the present embodiment can divide the target image into regions with high accuracy (details will be described later).

The statistical processing part 132 analyzes the target image divided into the object regions, and performs statistical processing (for example, processing of aggregating the number of objects, the sizes of the objects, and the like).

Further, the statistical processing part 132 changes a process condition of the target process 110 based on a result of the statistical processing.

<Hardware Configuration of Image Processing Apparatus>

Figure 2:
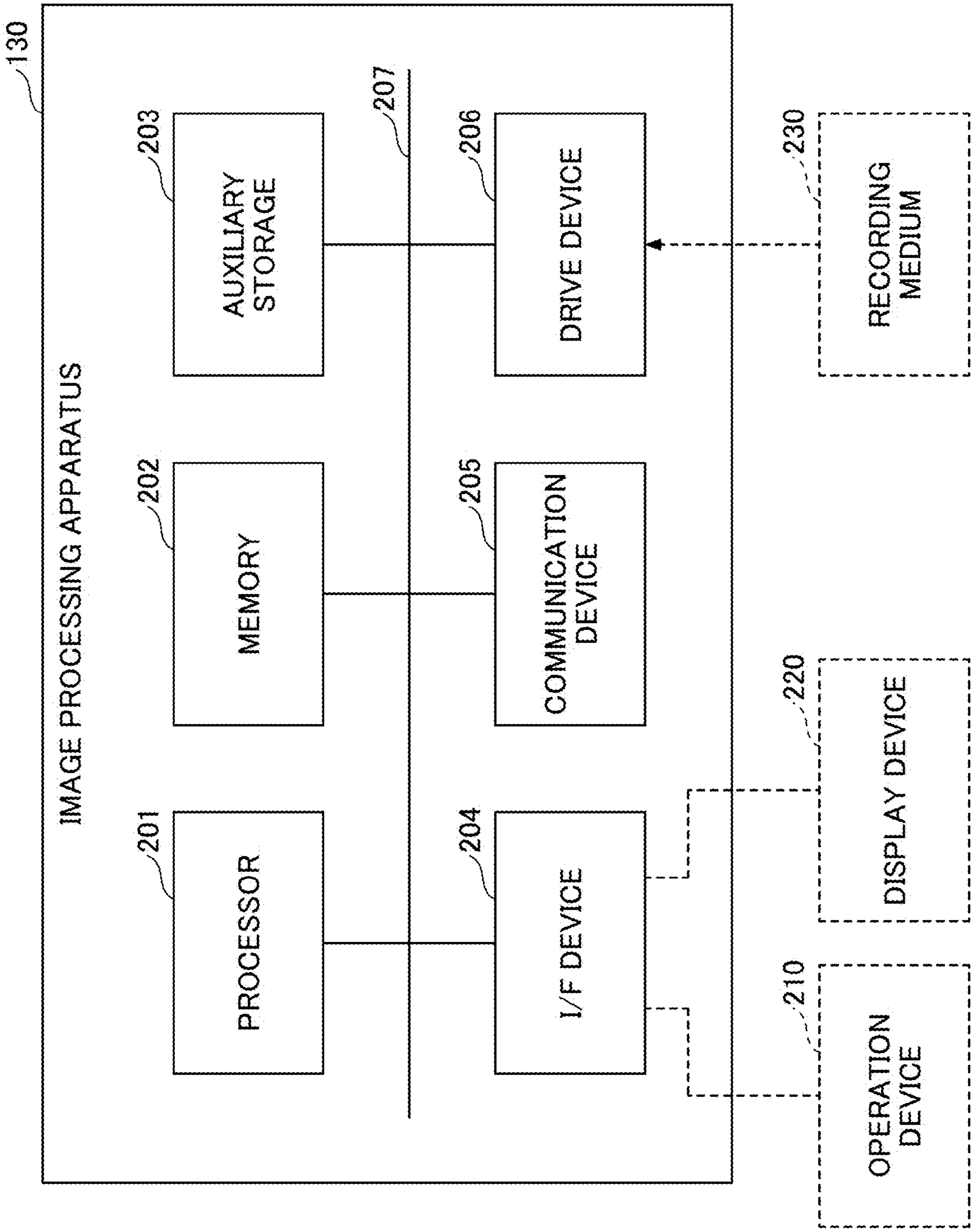
FIG. 2 is a diagram illustrating an example of a hardware configuration of an image processing apparatus.

Next, an example of a hardware configuration of the image processing apparatus 130 will be described. FIG. 2 is a diagram illustrating the example of the hardware configuration of the image processing apparatus.

As illustrated in FIG. 2, the image processing apparatus 130 includes a processor 201, a memory 202, an auxiliary storage 203, an interface (I/F) device 204, a communication device 205, and a drive device 206. The hardware components of the image processing apparatus 130 are connected to each other via a bus 207.

The processor 201 includes various computing devices such as a central processing unit (CPU) and a graphics processing unit (GPU). The processor 201 reads and executes various programs (for example, the image processing program and the like) on the memory 202.

The memory 202 includes a main storage device such as a read only memory (ROM) or a random access memory (RAM). The processor 201 and the memory 202 form what is known as a computer, and the computer implements various functions by the processor 201 executing various programs read on the memory 202.

The auxiliary storage 203 stores various programs and various data used when various programs are executed by the processor 201.

The I/F device 204 is a connection device connecting an operation device 210, a display device 220, and the image processing apparatus 130. The operation device 210 is an operation device for an operator to input various instructions into the image processing apparatus 130. The display device 220 is a display device for providing a display screen to the operator. The communication device 205 is a communication device for communicating with an external device (not illustrated) via a network.

The drive device 206 is a device in which a recording medium 230 is set. The recording medium 230 herein includes a medium for optically, electrically, or magnetically recording information, such as a CD-ROM, a flexible disk, a magneto-optical disk, or the like. Further, the recording medium 230 may include a semiconductor memory or the like for electrically recording information, such as a ROM, a flash memory, or the like.

The various programs to be installed in the auxiliary storage 203 are installed by, for example, setting the distributed recording medium 230 in the drive device 206, and reading out the various programs recorded in the recording medium 230 by the drive device 206. Alternatively, the various programs to be installed in the auxiliary storage 203 may be installed by being downloaded from the network via the communication device 205.

Specific Example of Process Control System

Figure 3:
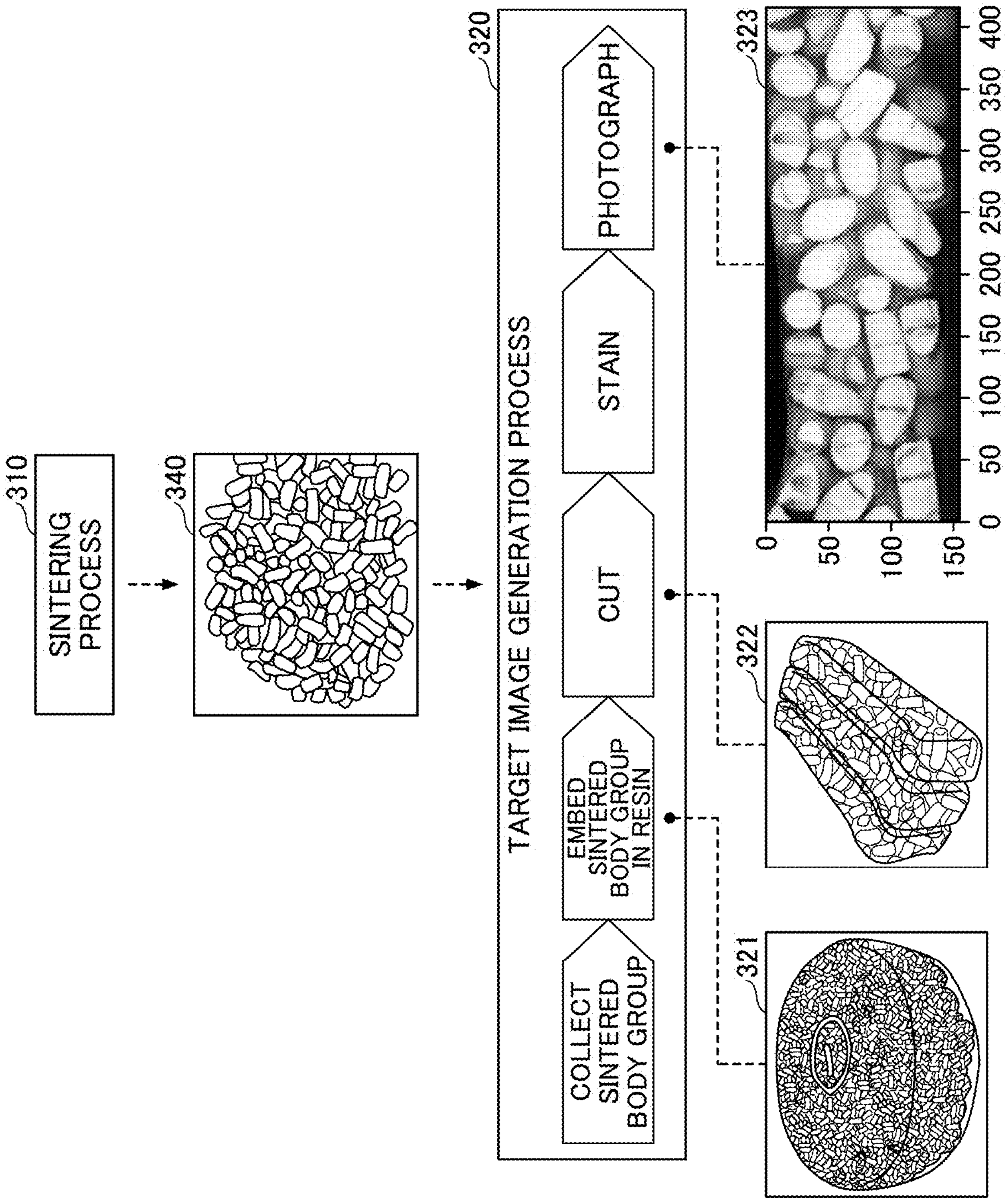
FIG. 3 is a diagram illustrating a specific example of the process control system.

Next, a specific example of the process control system 100 when the target process is a sintering process will be described. FIG. 3 is a diagram illustrating the specific example of the process control system. Hereinafter, in a specific example described in the present embodiment, the target process is a sintering process.

As illustrated in FIG. 3, a sintering process 310 is performed and a sintered body group 340 is generated. Then, a target image generation process 320 is performed.

As illustrated in FIG. 3, when the target process is the sintering process, sintered body group collection processing, resin embedding processing, cutting processing, staining processing, and photographing processing are performed in the target image generation process 320.

In the sintered body group collection processing, the generated sintered body group 340 is collected. In the resin embedding processing, the collected sintered body group 340 is embedded in a transparent resin, thereby generating a mass 321.

In the cutting processing, the mass 321 is cut at a plurality of positions, thereby generating a plurality of masses 322. In the staining processing, the cut surfaces of the plurality of masses 322 are stained. In the photographing processing, a target image 323 is generated by photographing a stained cut surface.

As described above, when the target process is the sintering process, a target image including an object group consisting of the cut surfaces of a plurality of sintered bodies is generated by photographing the cut surfaces of the sintered bodies embedded in a resin in a state in which the cut surfaces are stained and exposed.

<Details of Target Image>

Figure 4:
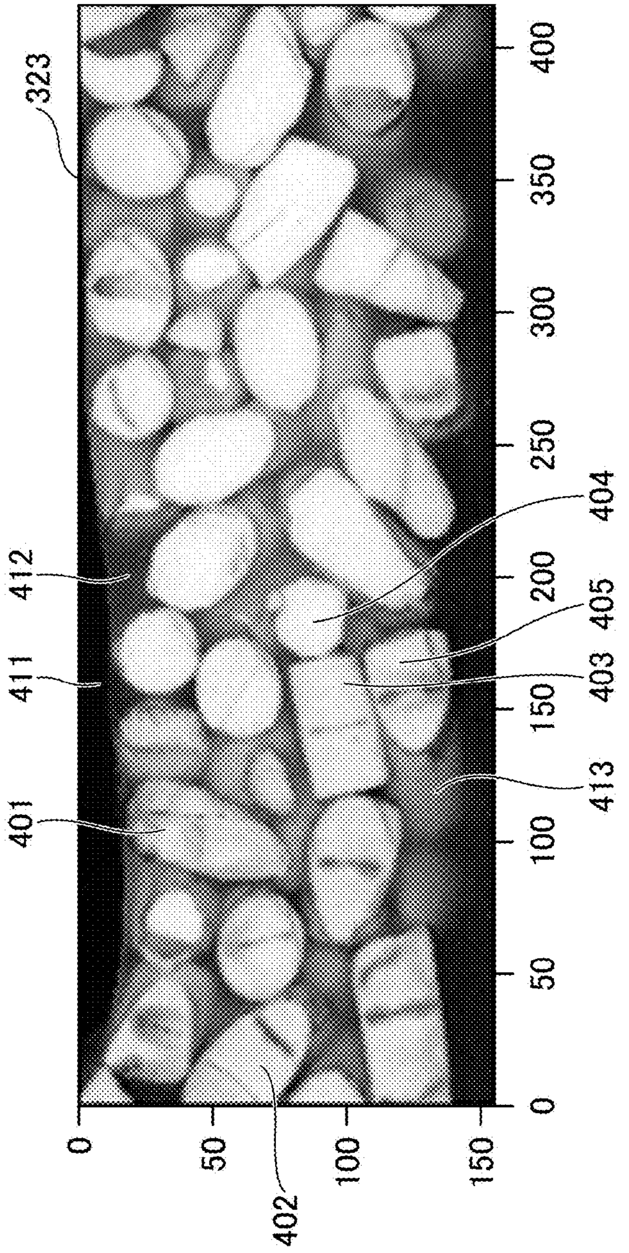
FIG. 4 is a diagram illustrating details of a target image.

Next, the target image 323 generated by the target image generation process 320 will be described in detail. FIG. 4 is a diagram illustrating details of the target image.

As illustrated in FIG. 4, the target image 323 has the following features.

- An object group includes objects consisting of the cut surfaces of a plurality of sintered bodies and densely arranged.
- The objects included in the object group have various shapes and sizes (for example, object regions 401 to 405 and the like).
- The colors of the inside of the objects are not uniform due to various irregularities, shading, and the like of the cut surfaces of the sintered bodies (for example, the object regions 401 to 405 and the like).
- The colors of background regions (reference numerals 411 to 413 and the like) that are regions other than the objects are not uniform due to the presence or absence of sintered bodies behind the background regions.

<Functional Configuration of Regional Division Part>

Next, a functional configuration of the regional division part 131 configured to divide a target image 323 into object regions will be described. As described above, the regional division part 131 combines a watershed method and U-Net, uses the U-Net to generate images to be used in the watershed method, and then divides the target image by the watershed method. Therefore, in the following description of the functional configuration of the regional division part 131, first,

- a functional configuration of a regional division part using a general watershed method will be described, and subsequently,
- a functional configuration of the regional division part 131 according to the present embodiment in which the watershed method and the U-Net are combined will be described. In this manner, features of the regional division part 131 will be clarified.

Figure 5:
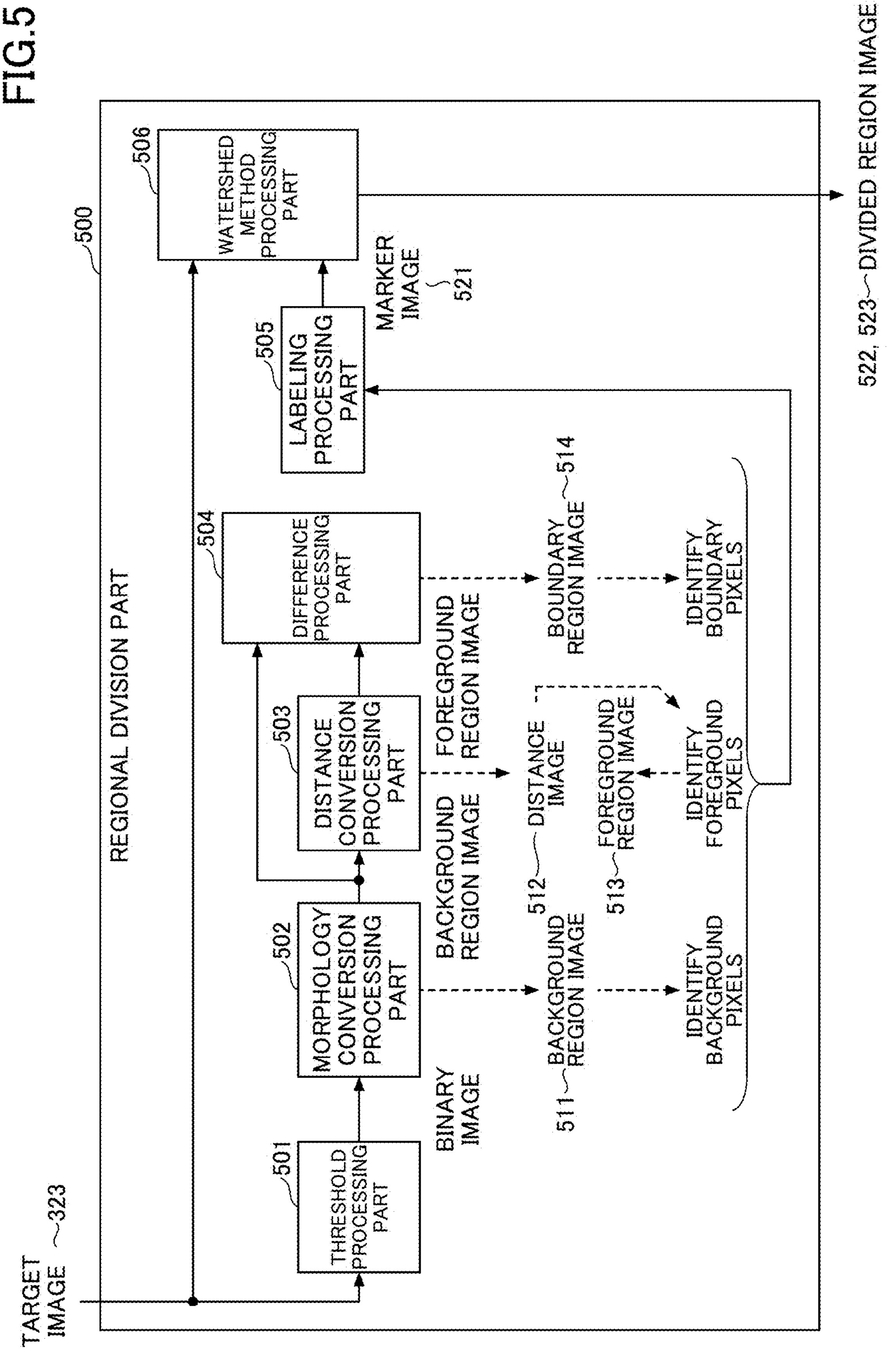
FIG. 5 is a diagram illustrating an example of a functional configuration of a regional division part using a general watershed method.
Figure 6:
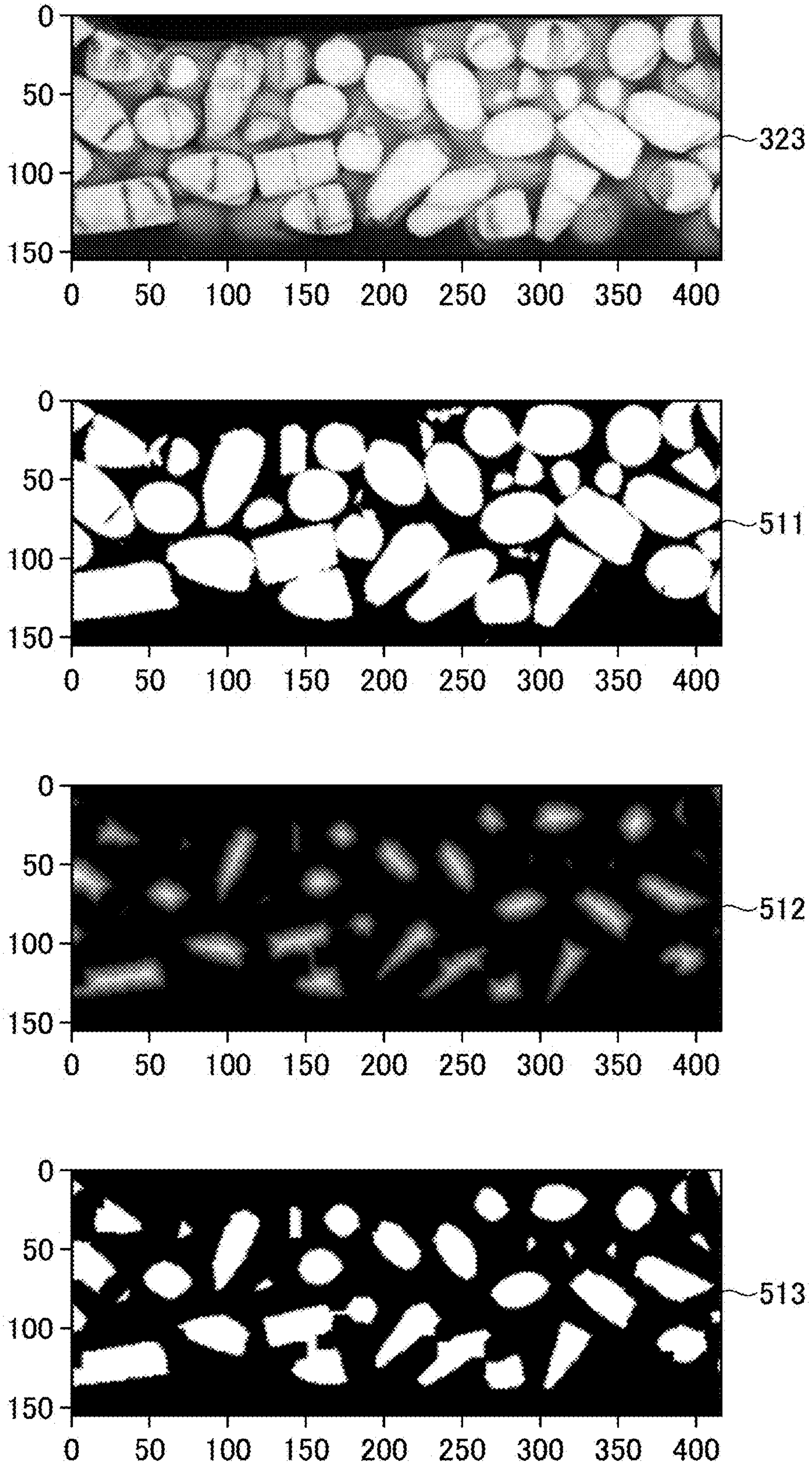
FIG. 6 is a first diagram illustrating a specific example of processing performed by the regional division part using the general watershed method.
Figure 7:
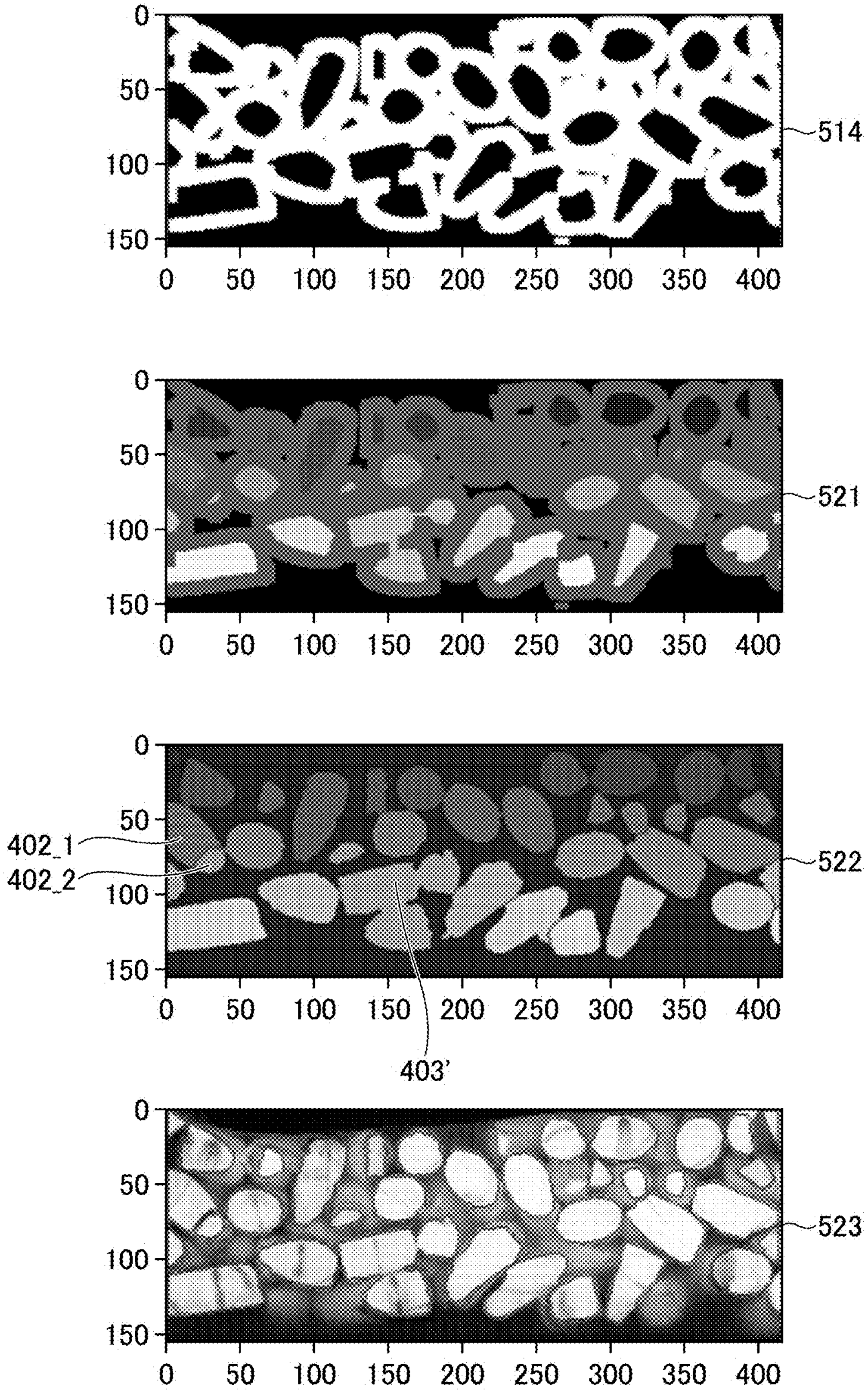
FIG. 7 is a second diagram illustrating the specific example of the processing performed by the regional division part using the general watershed method.

(1) Functional Configuration of the Regional Division Part Using the General Watershed Method First, the functional configuration of the regional division part using the general watershed method will be described by using FIG. 5, with reference to FIG. 6 and FIG. 7. FIG. 5 is a diagram illustrating an example of the functional configuration of the regional division part using the general watershed method. FIG. 6 and FIG. 7 are first and second diagrams illustrating a specific example of processing performed by the regional division part using the general watershed method.

As illustrated in FIG. 5, a regional division part 500 using the general watershed method includes a threshold processing part 501, a morphology conversion processing part 502, a distance conversion processing part 503, a difference processing part 504, a labeling processing part 505, and a watershed method processing part 506.

The threshold processing part 501 generates a binary image by performing threshold processing on a target image (for example, a target image 323 (see FIG. 3, FIG. 4, and FIG. 6)) based on an adjusted threshold parameter and converting pixels having a value less than the threshold parameter into black and pixels having a value greater than or equal to the threshold parameter into white. The binary image generated by the threshold processing part 501 is provided to the morphology conversion processing part 502.

The morphology conversion processing part 502 generates a background region image (for example, a background region image 511 (see FIG. 6)) by performing morphology conversion processing on the binary image, generated by the threshold processing part 501, based on an adjusted conversion parameter, and identifies background pixels. The background region image (for example, the background region image 511 (see FIG. 6)) generated by the morphology conversion processing part 502 is provided to the distance conversion processing part 503 and the difference processing part 504.

The distance conversion processing part 503 converts a pixel value of each pixel in a region other than a background region of the background region image generated by the morphology conversion processing part 502 into a pixel value corresponding to a distance from a background pixel, based on an adjusted conversion parameter. Thus, the distance conversion processing part 503 generates a distance image (for example, a distance image 512 (see FIG. 6)).

Further, the distance conversion processing part 503 identifies, as foreground pixels, pixels having a value greater than or equal to an adjusted threshold parameter in the distance image (for example, the distance image 512 (see FIG. 6)). Further, the distance conversion processing part 503 generates a foreground region image (for example, a foreground region image 513 (see FIG. 6)) in which the identified foreground pixels are white. The foreground region image (for example, the foreground region image 513 (see FIG. 6)) generated by the distance conversion processing part 503 is provided to the difference processing part 504.

The difference processing part 504 calculates a difference between the background region image (for example, the background region image 511 (see FIG. 6)) generated by the morphology conversion processing part 502 and the foreground region image (for example, the foreground region image 513 (see FIG. 6)) generated by the distance conversion processing part 503. Thus, the difference processing part 504 generates a boundary region image (for example, a boundary region image 514 (see FIG. 7)), and identifies boundary pixels.

The labeling processing part 505 generates a marker image (for example, a marker image 521 (see FIG. 7)) by performing labeling on each of:

the background pixels identified based on the background region image (for example, the background region image 511 (see FIG. 6));

the foreground pixels identified based on the foreground region image (for example, the foreground region image 513 (see FIG. 6)); and the boundary pixels identified based on the boundary region image (for example, the boundary region image 514 (see FIG. 7)).

The marker image (for example, the marker image 521 (see FIG. 7)) generated by the labeling processing part 505 is provided to the watershed method processing part 506.

The watershed method processing part 506 obtains the target image (for example, the target image 323 (see FIG. 3, FIG. 4, and FIG. 6)) and the marker image (for example, the marker image 521 (see FIG. 7)), and divides the target image into object regions by the watershed method. Thus, the watershed method processing part 506 generates and outputs a divided region image (for example, a divided region image 522 (see FIG. 7) in which regions of objects are color-coded so as to be identifiable). Alternatively, the watershed method processing part 506 generates and outputs a divided region image (for example, a divided region image 523 (see FIG. 7) in which the contours of objects are color-coded so as to be identifiable).

The regional division processing performed by the regional division part 500 using the general watershed method has the following problems.

As described above, each of the threshold processing part 501, the morphology conversion processing part 502, and the distance conversion processing part 503 of the regional division part 500 needs to appropriately adjust a threshold parameter or a conversion parameter. In the case of the target image 323 (an image in which inhomogeneous objects are densely arranged), it is not easy to find a threshold parameter or a conversion parameter suitable for all of a plurality of objects.

Therefore, for example, as in the case of an object region 402_1 and an object region 402_2 illustrated in FIG. 7, an object region that should be one object region 402 (see FIG. 4) may be divided into two object regions.

Alternatively, for example, as in the case of an object region 403' illustrated in FIG. 7, an object region that should be divided into three object regions 403 to 405 may be divided into one object region.

That is, when an image in which inhomogeneous objects are densely arranged is used as a target image, it is difficult for the general watershed method to divide the image into regions with high accuracy.

(2) Functional Configuration of Regional Division Part

Figure 8:
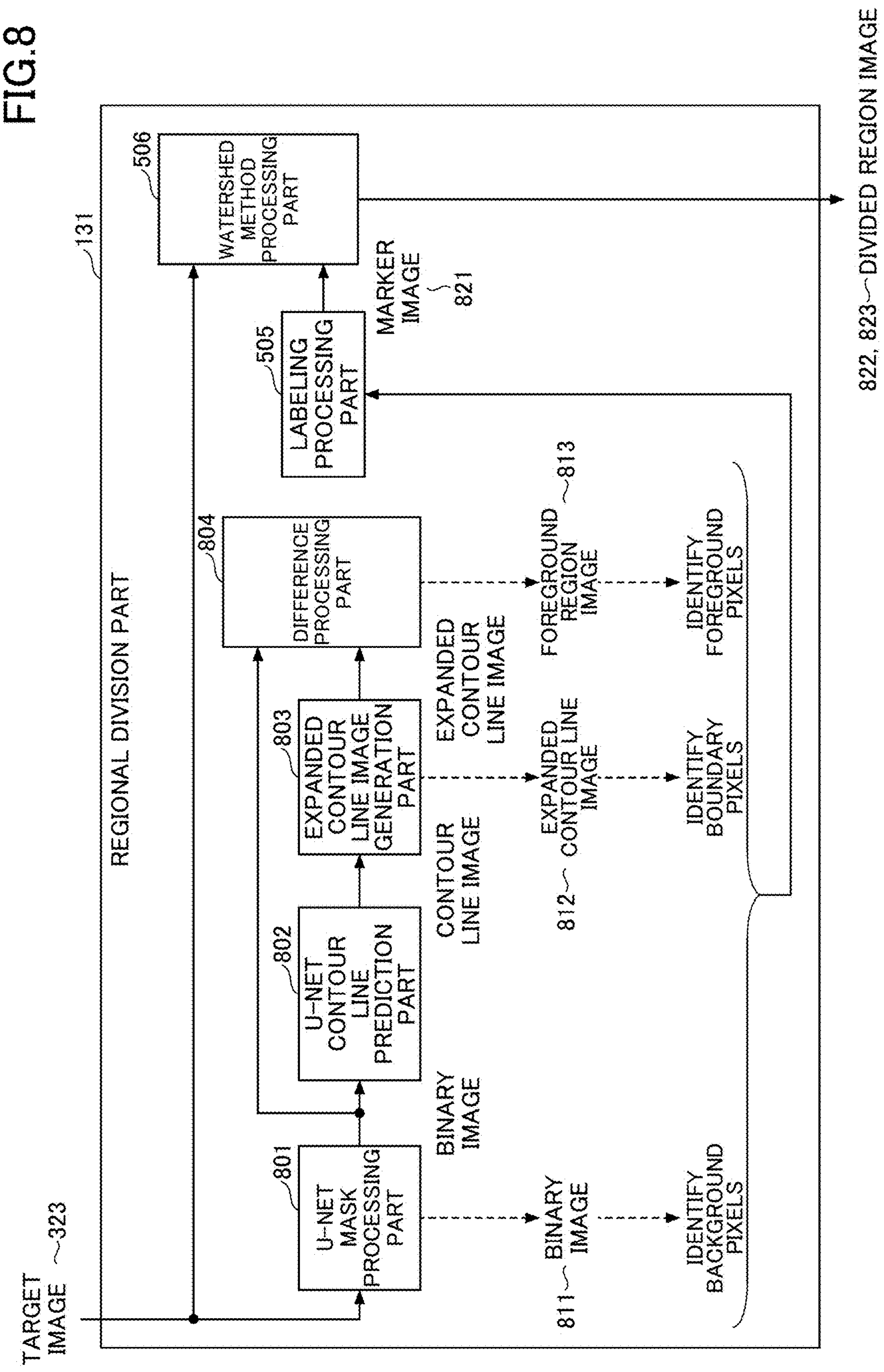
FIG. 8 is a diagram illustrating an example of a functional configuration of a regional division part.
Figure 9:
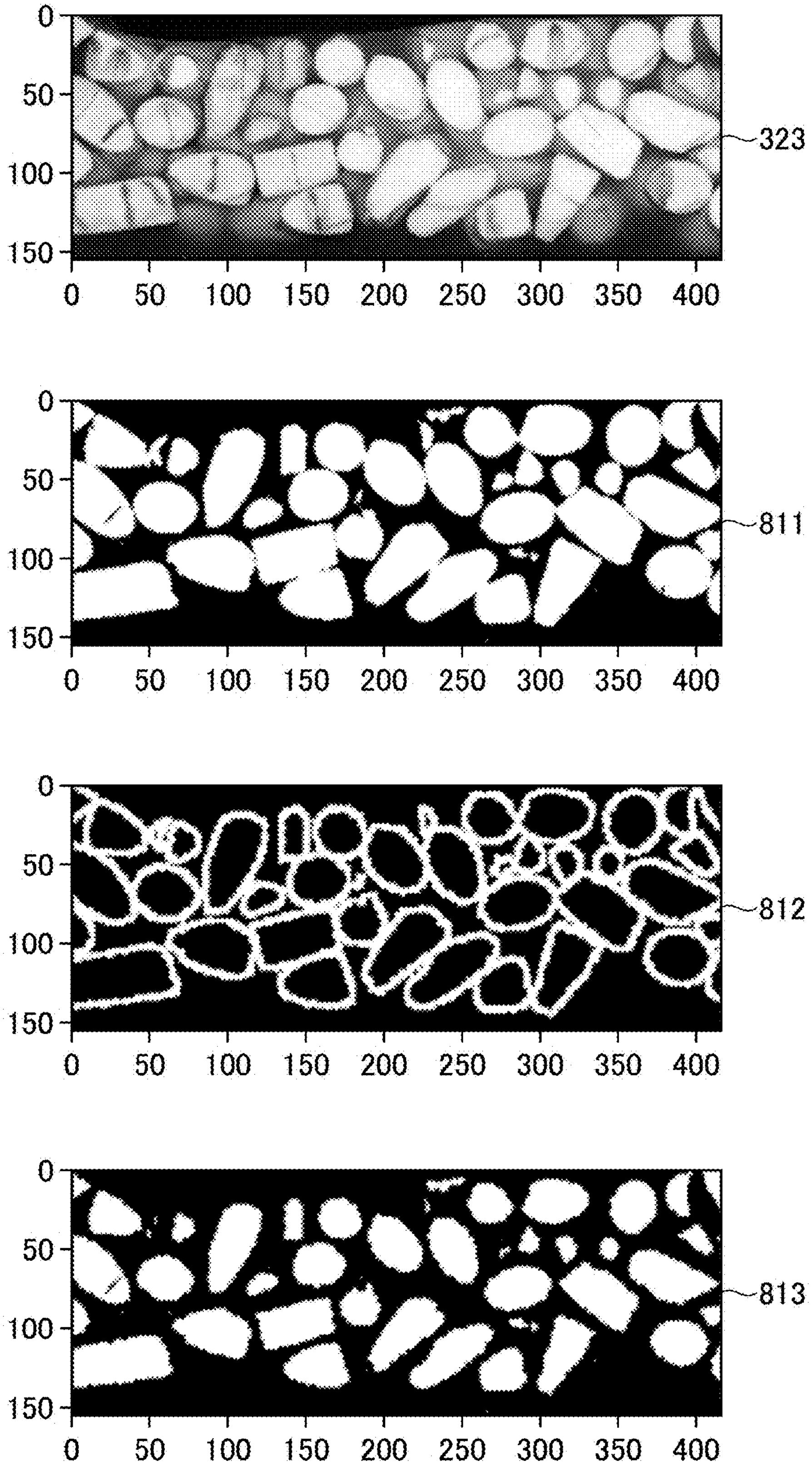
FIG. 9 is a first diagram illustrating a specific example of processing performed by the regional division part.
Figure 10:
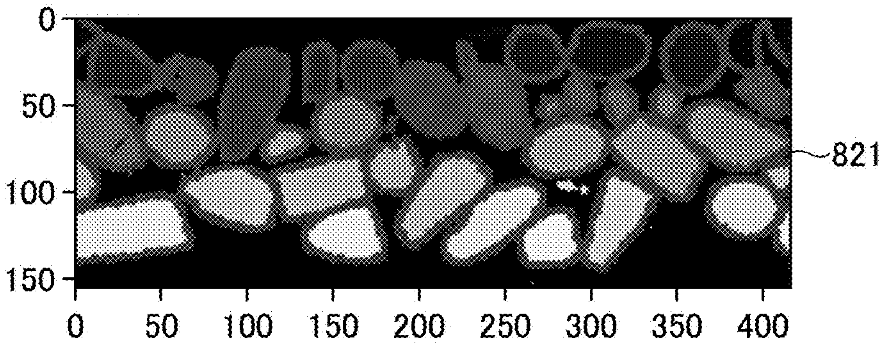
FIG. 10 is a second diagram illustrating the specific example of the processing performed by the regional division part.
Figure 10:
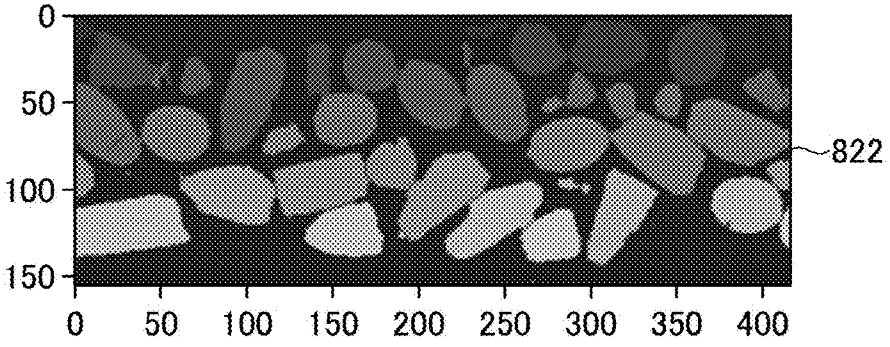
Figure 10:
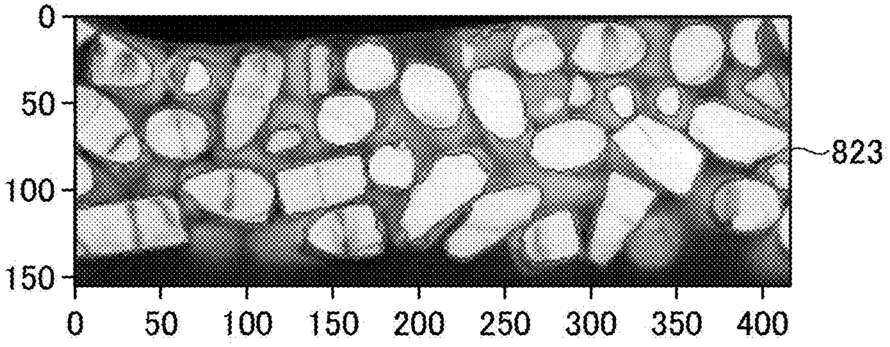

Next, a functional configuration of the regional division part 131 according to the present embodiment in which a watershed method and U-Net are combined will be described by using FIG. 8, with reference to FIG. 9 and FIG. 10. FIG. 8 is a diagram illustrating an example of a functional configuration of the regional division part. FIG. 9 and FIG. 10 are first and second diagrams illustrating a specific example of processing performed by the regional division part.

As illustrated in FIG. 8, the regional division part 131 includes a U-Net mask processing part 801, a U-Net contour line prediction part 802, an expanded contour line image generation part 803, a difference processing part 804, a labeling processing part 505, and a watershed method processing part 506.

The U-Net mask processing part 801 is an example of a binary image generation part. The U-Net mask processing part 801 has a deep learning model for a target image, which is a trained deep learning model (an example of a first trained model) that performs mask processing on an input image (predicts objects and a background and generates a binary image). Specifically, the network structure of the U-Net mask processing part 801 is U-Net. In the present embodiment, the U-Net mask processing part 801 has a trained deep learning model (that is, trained U-Net) that is trained by transfer learning using training data including:

an input image, which is an image including an object group consisting of cut surfaces of a plurality of sintered bodies, obtained by photographing the cut surfaces of the sintered bodies embedded in a resin in a state of being stained and exposed; and a correct image, which is an image obtained by processing the object group to be white and a background to be black in the input image.

The trained deep learning model can be generated by applying transfer learning to an existing trained deep learning model.

For example, an existing trained deep learning model trained by using, as training data, an input image, which is a photographic image obtained by photographing a car, and a correct image, which is an image in which the car is processed to be white and a background is processed to be black in the input image, is further subjected to transfer learning for a target image. In this manner, a trained deep learning model subjected to transfer learning for the target image (that is, trained U-Net subjected to transfer learning) can be generated. By applying transfer learning to an existing trained deep learning model, the number of pieces of newly required training data can be reduced, and the time required for training can be reduced.

The U-Net mask processing part 801 generates a binary image (for example, a binary image 811 (see FIG. 9)) upon the target image (for example, the target image 323 (see FIG. 3, FIG. 4, and FIG. 9)) being input. Thus, the U-Net mask processing part 801 identifies background pixels.

The binary image (for example, the binary image 811 (see FIG. 9)) generated by the U-Net mask processing part 801 is provided to the U-Net contour line prediction part 802 and the difference processing part 804.

The U-Net contour line prediction part 802 is an example of a prediction part. The U-Net contour line prediction part 802 has a trained deep learning model (an example of a second trained model) that predicts contour lines from the input binary image. Specifically, the network structure of the U-Net contour line prediction part 802 is U-Net. In the present embodiment, the U-Net contour line prediction part 802 has a trained deep learning model (that is, trained U-Net) trained by using training data including:

an input image, which is an image in which an object group is processed to be white and a background is processed to be black; and a correct image, which is an image in which contour lines of objects of the object group are processed to be white and the objects other than the contour lines and the background are processed to be black.

Upon the binary image (for example, the binary image 811 (see FIG. 8)) being input, the U-Net contour line prediction part 802 predicts contour lines and outputs a contour line image. The contour line image output from the U-Net contour line prediction part 802 is provided to the expanded contour line image generation part 803.

The expanded contour line image generation part 803 generates an expanded contour line image (for example, an expanded contour line image 812 (see FIG. 9)) by expanding the contour lines in the contour line image output from the U-Net contour line prediction part 802. Thus, the expanded contour line image generation part 803 identifies boundary pixels.

The expanded contour line image (for example, the expanded contour line image 812 (see FIG. 9)) generated by the expanded contour line image generation part 803 is provided to the difference processing part 804.

The difference processing part 804 is an example of a foreground region image generation part. The difference processing part 804 calculates a difference between the binary image (for example, the binary image 811 (see FIG. 9)) generated by the U-Net mask processing part 801 and the expanded contour line image (for example, the expanded contour line image 812 (see FIG. 9)) generated by the expanded contour line image generation part 803. Thus, the difference processing part 804 generates a foreground region image (for example, a foreground region image 813 (see FIG. 9)), and identifies foreground pixels.

The labeling processing part 505 generates a marker image (for example, a marker image 821 (see FIG. 10)) by performing labeling on each of:

the background pixels identified based on the binary image (for example, the binary image 811 (see FIG. 9));

the boundary pixels identified based on the expanded contour line image (for example, the expanded contour line image 812 (see FIG. 9)); and the foreground pixels identified based on the foreground region image (for example, the foreground region image 813 (see FIG. 9)). The marker image (for example, the marker image 821 (see FIG. 10)) generated by the labeling processing part 505 is provided to the watershed method processing part 506.

The watershed method processing part 506 obtains the target image (for example, the target image 323 (see FIG. 3, FIG. 4, and FIG. 9)) and the marker image (for example, the marker image 821 (see FIG. 10)), and divides the target image into object regions by a watershed method. Thus, the watershed method processing part 506 generates and outputs a divided region image (for example, a divided region image 822 (see FIG. 10) in which the regions of the objects are color-coded so as to be identifiable). Alternatively, the watershed method processing part 506 generates and outputs a divided region image (for example, a divided region image 823 (see FIG. 10) in which the contour lines of the objects are colored so as to be identifiable).

The regional division processing performed by the regional division part 131 according to the present embodiment, which combines the watershed method and the U-Net, has the following advantages.

In the regional division processing performed by the regional division part 500, various parameters need to be adjusted to generate a background region image, a foreground region image, and a boundary region image for identifying background pixels, foreground pixels, and boundary pixels. In contrast, in the regional division processing performed by the regional division part 131 according to the present embodiment, the trained deep learning models are used, and thus it is not necessary to adjust various parameters.

When a contour line image for identifying boundary pixels is output, the regional division part 131 according to the present embodiment predicts object regions and background regions from a target image, generates a binary image, predicts contour lines, and outputs a contour line image, instead of directly predicting the contour lines from the target image. Accordingly, the regional division part 131 according to the present embodiment can predict the contour lines with high accuracy. This is because, when the binary image is used, non-uniform colors of the inside of objects are removed, and thus the contour lines can be predicted without being affected by the non-uniform colors of the inside of the objects, unlike a case where the contour lines are predicted directly from the target image. Further, when the object regions and the background regions are predicted from the target image to generate the binary image, the influence of the non-uniform colors of the inside of the objects can be reduced as compared to when the contour lines are predicted from the target image. That is, by combining two types of trained deep learning models and predicting the contour lines in two stages, the influence of an inhomogeneous object group can be reduced, and as a result, the contour lines can be predicted with high accuracy and a small amount of training data.

As a result, even when an image of a group of densely arranged and inhomogeneous objects is used as a target image, the regional division part 131 according to the present embodiment can divide the target image into regions with high accuracy.

<Functional Configuration of Statistical Processing Part>

Figure 11:
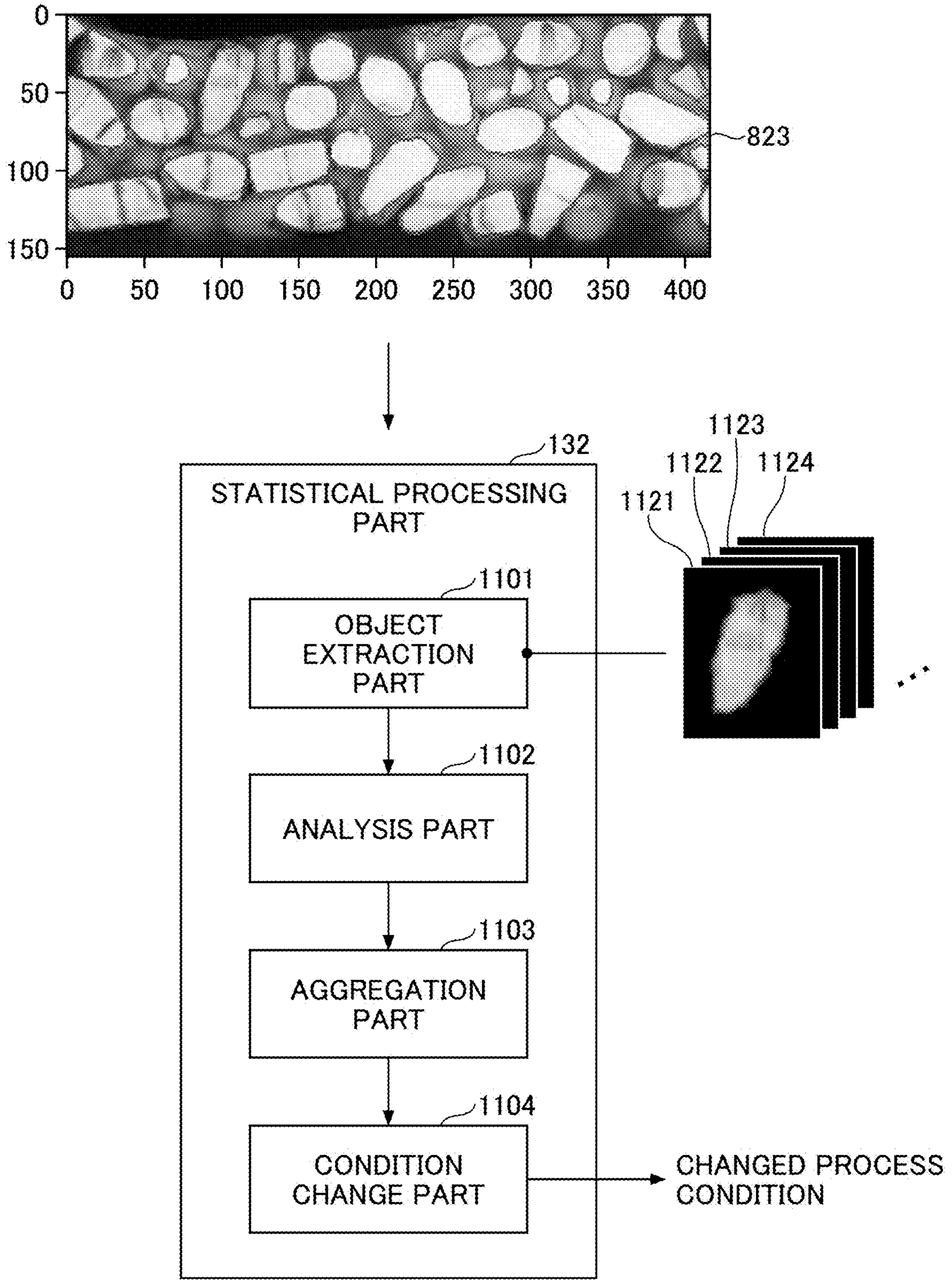
FIG. 11 is a diagram illustrating an example of a functional configuration of a statistical processing part.

Next, a functional configuration of a statistical processing part 132 will be described. FIG. 11 is a diagram illustrating an example of the functional configuration of the statistical processing part. As illustrated in FIG. 11, the statistical processing part 132 includes an object extraction part 1101, an analysis part 1102, an aggregation part 1103, and a condition change part 1104.

The object extraction part 1101 obtains the divided region image (for example, the divided region image 822 (see FIG. 10) or the divided region image 823 (see FIG. 10 and FIG. 11)) from the regional division part 131. Further, the object extraction part 1101 generates an image of each object, such as an image 1121, based on the obtained divided region image (for example, the divided region image 822 (see FIG. 10) or the divided region image 823 (see FIG. 10 and FIG. 11)).

The analysis part 1102 analyzes the image of each of the objects, such as the image 1121, generated by the object extraction part 1101, and identifies, for example, the types, the sizes, and the like of the objects.

The aggregation part 1103 aggregates the types, the sizes, and the like of the objects identified by the analysis part 1102, and outputs aggregation results.

The condition change part 1104 changes a process condition of the sintered bodies based on the aggregation results output from the aggregation part 1103, and outputs the changed process condition.

<Flow of Process Control Processing>

Figure 12:
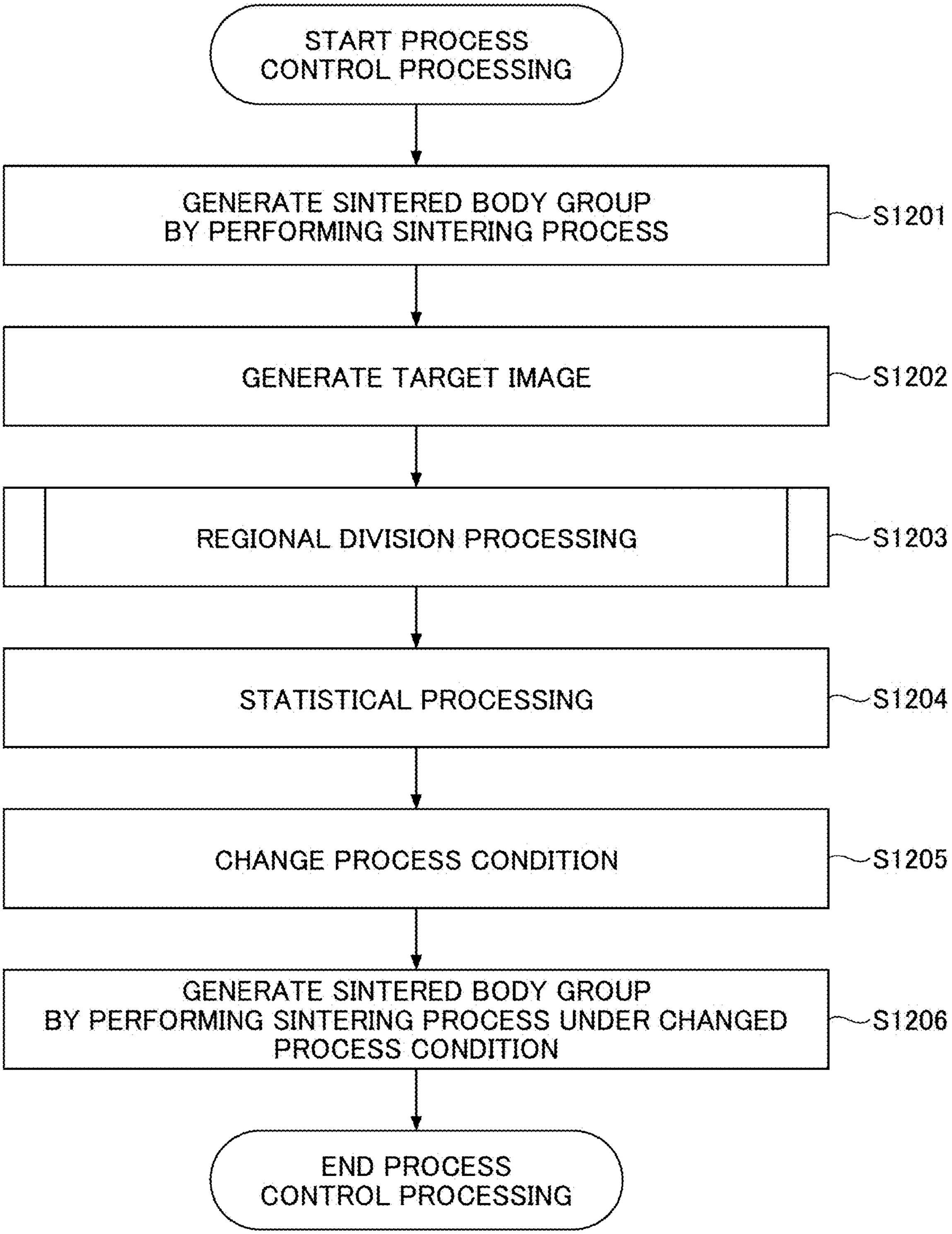
FIG. 12 is a flowchart illustrating a flow of process control processing.

Next, a flow of process control processing performed by the process control system 100 will be described. FIG. 12 is a flowchart illustrating the flow of the process control processing.

In step S1201, a sintered body group 340 is generated by performing the sintering process 310.

In step S1202, a target image 323 including an inhomogeneous object group is generated by performing the target image generation process 320.

In step S1203, the image processing apparatus 130 performs regional division processing of dividing the target image 323 into object regions. The regional division processing will be described in detail later.

In step S1204, the image processing apparatus 130 analyzes a divided region image 822 or a divided region image 823 generated by performing the regional division processing, and outputs aggregation results by performing statistical processing.

In step S1205, the image processing apparatus 130 changes a process condition based on the aggregation results, and outputs the changed process condition.

In step S1206, a sintered body group 340 is generated by performing the sintering process 310 under the changed process condition.

<Flow of Regional Division Processing>

Figure 13:
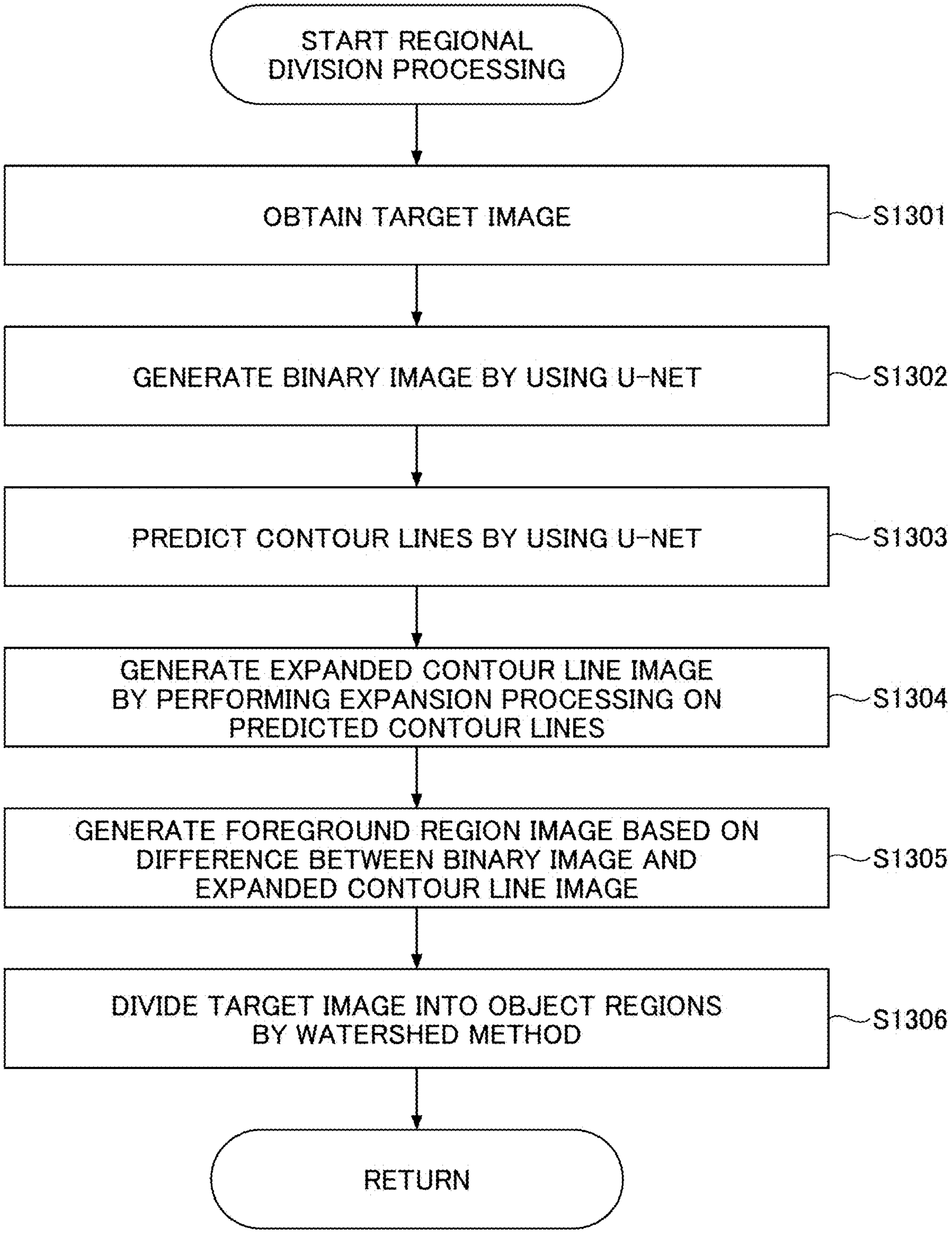
FIG. 13 is a flowchart illustrating a flow of regional division processing.

Next, the regional division processing (step S1203) will be described in detail. FIG. 13 is a flowchart illustrating a flow of the regional division processing.

In step S1301, the image processing apparatus 130 obtains the target image 323.

In step S1302, the image processing apparatus 130 generates a binary image 811 from the target image 323 by using a trained deep learning model whose network structure is U-Net, and identifies background pixels.

In step S1303, the image processing apparatus 130 predicts contour lines from the binary image by using a trained deep learning model whose network structure is U-Net, and generates a contour line image.

In step S1304, the image processing apparatus 130 generates an expanded contour line image 812 by performing expansion processing on the contour line image, and identifies boundary pixels.

In step S1305, the image processing apparatus 130 generates a foreground region image 813 based on a difference between the binary image 811 and the expanded contour line image 812, and identifies foreground pixels.

In step S1306, the image processing apparatus 130 uses the identified background pixels, the identified boundary pixels, and the identified foreground pixels to divide the target image 323 into object regions by the watershed method.

Summary

As is clear from the above description, the image processing apparatus 130 according to the first embodiment is configured to:

- generate a binary image from a target image by using a deep learning model (network structure=U-Net) that binarizes the target image into object regions and a background region and generates the binary image;
- predict contour lines of the object regions in the binary image generated from the target image, by using a deep learning model (network structure=U-Net) that predicts the contour lines of the object regions in the binary image;
- generate an expanded contour line image by performing expansion processing on the predicted contour lines;
- generate a foreground region image based on a difference between the binary image generated from the target image and the expanded contour line image; and
- use background pixels identified based on the binary image generated from the target image, boundary pixels identified based on the expanded contour line image, and foreground pixels identified based on the foreground region image to divide the target image into the object regions by a watershed method.

Accordingly, in the first embodiment, it is not necessary to adjust various parameters when generating a background region image, a foreground region image, and a boundary region image for identifying background pixels, foreground pixels, and boundary pixels. Further, according to the first embodiment, contour lines can be predicted with high accuracy and with a small amount of training data, as compared to when the contour lines are predicted directly from a target image.

As a result, according to the first embodiment, division accuracy when an image including an inhomogeneous object group is divided into regions can be improved.

Second Embodiment

In the first embodiment, an example in which U-Net is used as a network structure of a deep learning model has been described. However, the network structure of the deep learning model is not limited to the U-Net. For example, any other deep learning model can be applied as long as the deep learning model has a network structure having a convolutional layer and is capable of outputting an image when an image is input. However, in order to predict the contour lines of object regions more appropriately, it is preferable that a deep learning model can output the contours of individual objects.

In the first embodiment, a specific example in which a particle body group is a sintered body group has been described. However, the particle body group generated by the target process 110 is not limited to the sintered body group, and may be any other particle body group. For example, examples of any other particle body group include spheroids.

Further, in the first embodiment, an example in which the regional division part 131 outputs a divided region image 822 or a divided region image 823 has been described. However, an image output from the regional division part 131 is not limited to the divided region image 822 or the divided region image 823, and may be another image.

Further, in the first embodiment, an example in which the statistical processing part 132 outputs aggregation results obtained by aggregating the types of objects and the sizes of the objects has been described. However, items to be output as aggregation results are not limited thereto.

Further, in the first embodiment, an example in which a process condition is changed based on the aggregation results, and the changed process condition is output has been described. However, an item to be output from the statistical processing part 132 to the target process 110 is not limited thereto.

The present invention is not limited to the configurations or the like of the embodiments described above, and the configurations may be combined with other elements. Modifications may be made without departing from the scope of the subject matter of the present invention, and the modifications can be appropriately determined according to applications.

This application is based on and claims priority to Japanese Patent Application No. 2022-091556, filed on Jun. 6, 2022, the entire contents of which are incorporated herein by reference.

DESCRIPTION OF THE REFERENCE NUMERALS

100: process control system
130: image processing apparatus
131: regional division part
132: statistical processing part
323: target image
505: labeling processing part
506: watershed method processing part
801: U-Net mask processing part
802: U-Net contour line prediction part
803: expanded contour line image generation part
804: difference processing part

The invention claimed is:

1. An image processing apparatus comprising:
a processor; and
a memory storing program instructions that cause the processor to:
generate a binary image from a target image by using a first trained model that binarizes the target image into object regions and a background region and generates the binary image;
predict contour lines of the object regions in the binary image generated from the target image, by using a second trained model that predicts the contour lines of the object regions in the binary image;
generate an expanded contour line image by performing expansion processing on the predicted contour lines;
generate a foreground region image based on the binary image generated from the target image and the expanded contour line image; and
use background pixels identified based on the binary image generated from the target image, boundary pixels identified based on the expanded contour line image, and foreground pixels identified based on the foreground region image to divide the target image into the object regions by a watershed method.

2. The image processing apparatus according to claim 1, wherein the program instructions cause the processor to use trained U-Net as the first trained model to generate the binary image from the target image.

3. The image processing apparatus according to claim 2, wherein the program instructions cause the processor to use trained U-Net as the second trained model to generate a contour line image from the binary image generated from the target image.

4. The image processing apparatus according to claim 3, wherein the program instructions cause the processor to generate the foreground region image by calculating a difference between the binary image generated from the target image and the expanded contour line image.

5. The image processing apparatus according to claim 1, wherein the target image is an image obtained by photographing a particle body group under a predetermined condition.

6. The image processing apparatus according to claim 5, wherein the program instructions cause the processor to analyze an image of each of the object regions divided from the target image and perform statistical processing.

7. The image processing apparatus according to claim 6, wherein the program instructions cause the processor to change, based on a result of the statistical processing, a process condition of a process of generating the particle body group.

8. An image processing method performed by a computer, the image processing method comprising:
generating a binary image from a target image by using a first trained model that binarizes the target image into object regions and a background region and generates the binary image;
predicting contour lines of the object regions in the binary image generated from the target image, by using a second trained model that predicts the contour lines of the object regions in the binary image;
generating an expanded contour line image by performing expansion processing on the predicted contour lines;

generating a foreground region image based on the binary image generated from the target image and the expanded contour line image; and using background pixels identified based on the binary image generated from the target image, boundary pixels identified based on the expanded contour line image, and foreground pixels identified based on the foreground region image to divide the target image into the object regions by a watershed method.

9. A non-transitory computer-readable recording medium storing an image processing program for causing a computer to execute a process comprising:

generating a binary image from a target image by using a first trained model that binarizes the target image into object regions and a background region and generates the binary image;

predicting contour lines of the object regions in the binary image generated from the target image, by using a second trained model that predicts the contour lines of the object regions in the binary image;

generating an expanded contour line image by performing expansion processing on the predicted contour lines;

generating a foreground region image based on the binary image generated from the target image and the expanded contour line image; and using background pixels identified based on the binary image generated from the target image, boundary pixels identified based on the expanded contour line image, and foreground pixels identified based on the foreground region image to divide the target image into the object regions by a watershed method.

* * * * *